(12) United States Patent
Hermann et al.

(10) Patent No.: US 7,736,799 B1
(45) Date of Patent: Jun. 15, 2010

(54) METHOD AND APPARATUS FOR MAINTAINING CELL WALL INTEGRITY DURING THERMAL RUNAWAY USING AN OUTER LAYER OF INTUMESCENT MATERIAL

(75) Inventors: Weston Arthur Hermann, Palo Alto, CA (US); Vineet Haresh Mehta, Mountain View, CA (US); Alex Prilutsky, San Mateo, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 12/460,423

(22) Filed: Jul. 17, 2009

Related U.S. Application Data

(63) Continuation of application No. 12/504,712, filed on Jul. 17, 2009.

(51) Int. Cl.
*H01M 2/02* (2006.01)
(52) U.S. Cl. .......................... 429/177; 429/50; 429/53; 429/176
(58) Field of Classification Search .................. 429/50, 429/53, 129, 133, 176, 177, 153, 155, 159
See application file for complete search history.

(56) References Cited

U.S. PATENT DOCUMENTS

| | | | |
|---|---|---|---|
| 4,137,376 A * | 1/1979 | Clegg et al. ................. 429/104 |
| 4,483,908 A * | 11/1984 | Zimmerman ................... 429/8 |
| 6,127,064 A | 10/2000 | Shibata et al. | |
| 6,146,785 A | 11/2000 | Rigobert et al. | |
| 6,682,847 B2 * | 1/2004 | Inoue et al. ................. 429/167 |
| 6,706,446 B2 | 3/2004 | Nakai et al. | |

FOREIGN PATENT DOCUMENTS

| EP | 807984 A1 | 11/1997 |
|---|---|---|
| JP | 2002298793 A | 10/2002 |

OTHER PUBLICATIONS

Berdichevsky et al., The Tesla Roadster Battery System, http://www.teslamotors.com/display_data/TeslaRoadsterBatterySystem.pdf, Aug. 16, 2006, pp. 1-5.

* cited by examiner

*Primary Examiner*—Gregg Cantelmo
(74) *Attorney, Agent, or Firm*—Patent Law Office of David G. Beck

(57) ABSTRACT

A method and apparatus is provided in which a layer of an intumescent material surrounds the casing of a battery, the layer helping to prevent the formation of perforations in the battery casing during a thermal runaway event and, if a perforation is formed, inhibiting the flow of hot, pressurized gas from within the battery. A sleeve, surrounding the cell, may be used to contain the intumescent material during the thermal event.

6 Claims, 6 Drawing Sheets

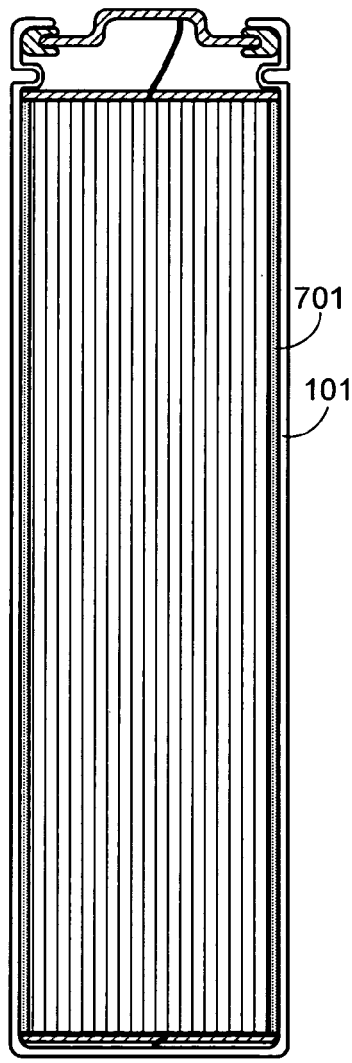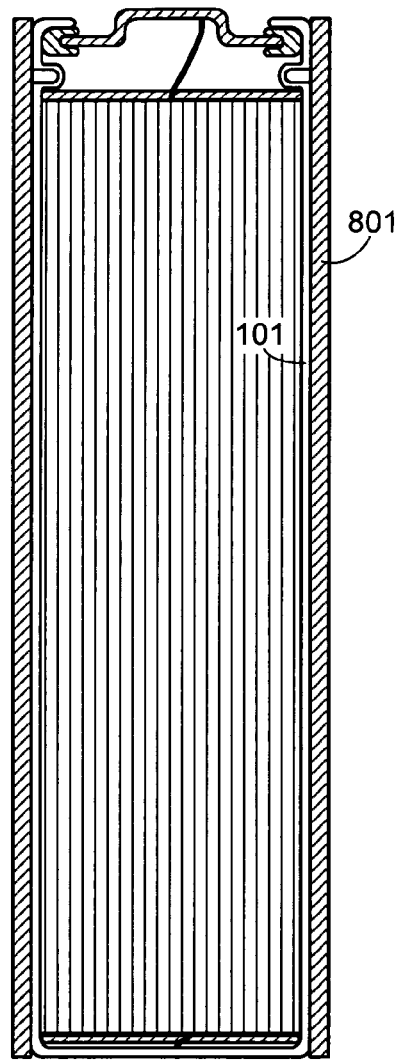
FIG. 7                    FIG. 8

METHOD AND APPARATUS FOR MAINTAINING CELL WALL INTEGRITY DURING THERMAL RUNAWAY USING AN OUTER LAYER OF INTUMESCENT MATERIAL

CROSS-REFERENCES TO RELATED APPLICATIONS

This application is a continuation of U.S. patent application Ser. No. 12/504,712, filed Jul. 17, 2009, the disclosure of which is incorporated herein by reference for any and all purposes.

FIELD OF THE INVENTION

The present invention relates generally to batteries, and more particularly, to a means for maintaining cell wall integrity during thermal runaway.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage and, in some circumstances, bodily harm or loss of life. When a battery undergoes thermal runaway, it typically emits a large quantity of smoke, jets of flaming liquid electrolyte, and sufficient heat to lead to the combustion and destruction of materials in close proximity to the cell. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of a battery within an unattended laptop will likely result in not only the destruction of the laptop, but also at least partial destruction of its surroundings, e.g., home, office, car, laboratory, etc. If the laptop is on-board an aircraft, for example within the cargo hold or a luggage compartment, the ensuing smoke and fire may lead to an emergency landing or, under more dire conditions, a crash landing. Similarly, the thermal runaway of one or more batteries within the battery pack of a hybrid or electric vehicle may destroy not only the car, but may lead to a car wreck if the car is being driven or the destruction of its surroundings if the car is parked.

One approach to overcoming this problem is by reducing the risk of thermal runaway. For example, to prevent batteries from being shorted out during storage and/or handling, precautions can be taken to ensure that batteries are properly stored, for example by insulating the battery terminals and using specifically designed battery storage containers. Another approach to overcoming the thermal runaway problem is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes.

SUMMARY OF THE INVENTION

FIG. 1 is a simplified cross-sectional view of a conventional battery 100, for example a lithium ion battery utilizing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. Typically cell casing 101 is fabricated in such a way that the bottom surface 102 is integrated into the case, resulting in a seamless lower cell casing. The open end of cell case 101 is sealed by a cap assembly 105, assembly 105 including a battery terminal 107, e.g., the positive terminal, and an insulator 109, insulator 109 preventing terminal 107 from making electrical contact with case 101. Although not shown, a typical cap assembly will also include an internal positive temperature coefficient (PTC) current limiting device, a current interrupt device (CID), and a venting mechanism, the venting mechanism designed to rupture at high pressures and provide a pathway for cell contents to escape. Additionally, cap assembly 105 may contain other seals and elements depending upon the selected design/configuration.

Electrode assembly 103 is comprised of an anode sheet, a cathode sheet and an interposed separator, wound together in a spiral pattern often referred to as a 'jellyroll'. An anode electrode tab 111 connects the anode electrode of the wound electrode assembly to the negative terminal while a cathode tab 113 connects the cathode electrode of the wound electrode assembly to the positive terminal. In the illustrated embodiment, the negative terminal is case 101 and the positive terminal is terminal 107. In most configurations, battery 100 also includes a pair of insulators 115/117. Case 101 includes a crimped portion 119 that is designed to help hold the internal elements, e.g., seals, electrode assembly, etc., in place.

In a conventional cell, such as the cell shown in FIG. 1, a variety of different abusive operating/charging conditions and/or manufacturing defects may cause the cell to enter into thermal runaway, where the amount of internally generated heat is greater than that which can be effectively withdrawn. As a result, a large amount of thermal energy is rapidly released, heating the entire cell up to a temperature of 900° C. or more and causing the formation of localized hot spots where the temperature may exceed 1500° C. Accompanying this energy release is the release of gas, causing the gas pressure within the cell to increase.

To combat the effects of thermal runaway, a conventional cell will typically include a venting element within the cap assembly. The purpose of the venting element is to release, in a somewhat controlled fashion, the gas generated during the thermal runaway event, thereby preventing the internal gas pressure of the cell from exceeding its predetermined operating range.

While the venting element of a cell may prevent excessive internal pressure, this element may have little effect on the thermal aspects of a thermal runaway event. For example, if a local hot spot occurs in cell 100 at a location 121, the thermal energy released at this spot may be sufficient to heat the adjacent area 123 of the single layer casing wall 101 to above its melting point. Even if the temperature of area 123 is not increased beyond its melting point, the temperature of area 123 in concert with the increased internal cell pressure may quickly lead to the casing wall being perforated at this location. Once perforated, the elevated internal cell pressure will cause additional hot gas to be directed to this location, further compromising the cell at this and adjoining locations.

It should be noted that when a cell undergoes thermal runaway and vents in a controlled fashion using the intended venting element, the cell wall may still perforate due to the size of the vent, the material characteristics of the cell wall, and the flow of hot gas traveling along the cell wall as it rushes towards the ruptured vent. Once the cell wall is compromised, i.e., perforated, collateral damage can quickly escalate, due both to the unpredictable location of such a hot spot and due to the unpredictable manner in which such cell wall perforations grow and affect neighboring cells. For example, if the cell is one of a large array of cells comprising a battery pack, the jet of hot gas escaping the cell perforation may heat the adjacent cell to above its critical temperature, causing the adjacent cell to enter into thermal runaway. Accordingly, it will be appreciated that the perforation of the wall of one cell during thermal runaway can initiate a cascading reaction that can spread throughout the battery pack. Furthermore, even if the jet of hot gas escaping the cell perforation from the first cell does not initiate thermal runaway in the adjacent cell, it may still affect the health of the adjacent cell, for example by weakening the adjacent cell wall, thereby making the adjacent cell more susceptible to future failure.

As previously noted, cell perforations are due to localized, transient hot spots where hot, pressurized gas from a concentrated thermal event is flowing near the inner surface of the cell. Whether or not a cell transient hot spot perforates the cell wall or simply dissipates and leaves the cell casing intact depends on a number of factors. These factors can be divided into two groups; those that are based on the characteristics of the thermal event and those that are based on the physical qualities of the cell casing. Factors within the first group include the size and temperature of the hot spot as well as the duration of the thermal event and the amount of gas generated by the event. Factors within the second group include the wall thickness as well as the casing's yield strength as a function of temperature, heat capacity and thermal conductivity.

FIG. 2 illustrates the conventional approach to improving the failure resistance of a cell, where failure is defined as a thermally induced wall perforation. As shown, in cell 200 the thickness of casing 201 has been significantly increased, thereby improving the cell's failure resistance at the expense of cell weight. Assuming that cell mass is not an issue, which it is not for many consumer applications where only a few cells are used, the conventional approach to preventing wall perforations during thermal runaway is quite effective. Unfortunately, for those applications in which the battery pack may include hundreds or even thousands of cells, for example the battery pack of an electric vehicle, the added mass of this approach is very unattractive since performance is directly tied to mass. For instance, if the conventional approach only adds 4 grams per cell, for a battery pack with 10,000 cells, this increase adds up to 40 kg. Accordingly, for these applications, the conventional approach to improving cell failure resistance is unacceptable and an improved means for maintaining cell integrity during thermal runaway is needed. The present invention provides such a means.

The present invention provides a method and apparatus for inhibiting the formation of perforations in the battery casing during a thermal runaway event.

In at least one embodiment of the invention, a battery assembly is provided comprised of a battery and a layer of an intumescent material surrounding an outer surface of the battery cell case. The intumescent material may be comprised of graphite-based intumescent materials, thermoplastic elastomers, ceramic-based intumescent materials, vermiculite/mineral fiber based intumescent materials, and ammonium polyphosphate based intumescent materials. Preferably the intumescent material comprising the layer has a start expansion temperature in the range of 100° C. to 300° C., and more preferably in the range of 200° C. to 300° C. Preferably the intumescent material is biologically inert. The battery assembly may further comprise a sleeve that surrounds the intumescent layer and is spaced apart from the intumescent layer. Preferably the sleeve is comprised of a material with a yield strength of at least 75 MPa; and/or a yield strength of at least 150 MPa; and/or a yield strength of at least 250 MPa. The battery assembly may further comprise at least one spacer ring that separates the interior surface of the sleeve with the exterior surface of the intumescent material. The battery assembly may further comprise a second layer of the intumescent material, which may be integral with the layer of intumescent material surrounding the outer surface of the cell case, wherein the second layer covers the cell case bottom.

In at least one embodiment of the invention, a method of preventing the formation of a perforation in the outer surface of a battery case during a thermal runaway event is provided, the method comprising the step of covering the outer surface of the battery case in a layer of an intumescent material, wherein the covering step is performed prior to the thermal runaway event. The method may further comprise the step of surrounding the layer of intumescent material with a sleeve, wherein the sleeve is separated from the intumescent layer by a preset distance. The covering step may comprise the step of coating the outer surface of the cell case with the intumescent material. The covering step may further comprise the step of forming a strip of the intumescent material and wrapping the strip around the outer surface of the battery case, which may be bonded in place.

A further understanding of the nature and advantages of the present invention may be realized by reference to the remaining portions of the specification and the drawings.

BRIEF DESCRIPTION OF THE DRAWINGS

FIG. 7 illustrates an alternate embodiment utilizing a layer of thermally insulating material interposed between the electrode assembly and the inner surface of the cell casing;

FIG. 8 illustrates an alternate embodiment utilizing a high heat capacity layer;

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale.

Figures 1, 2:
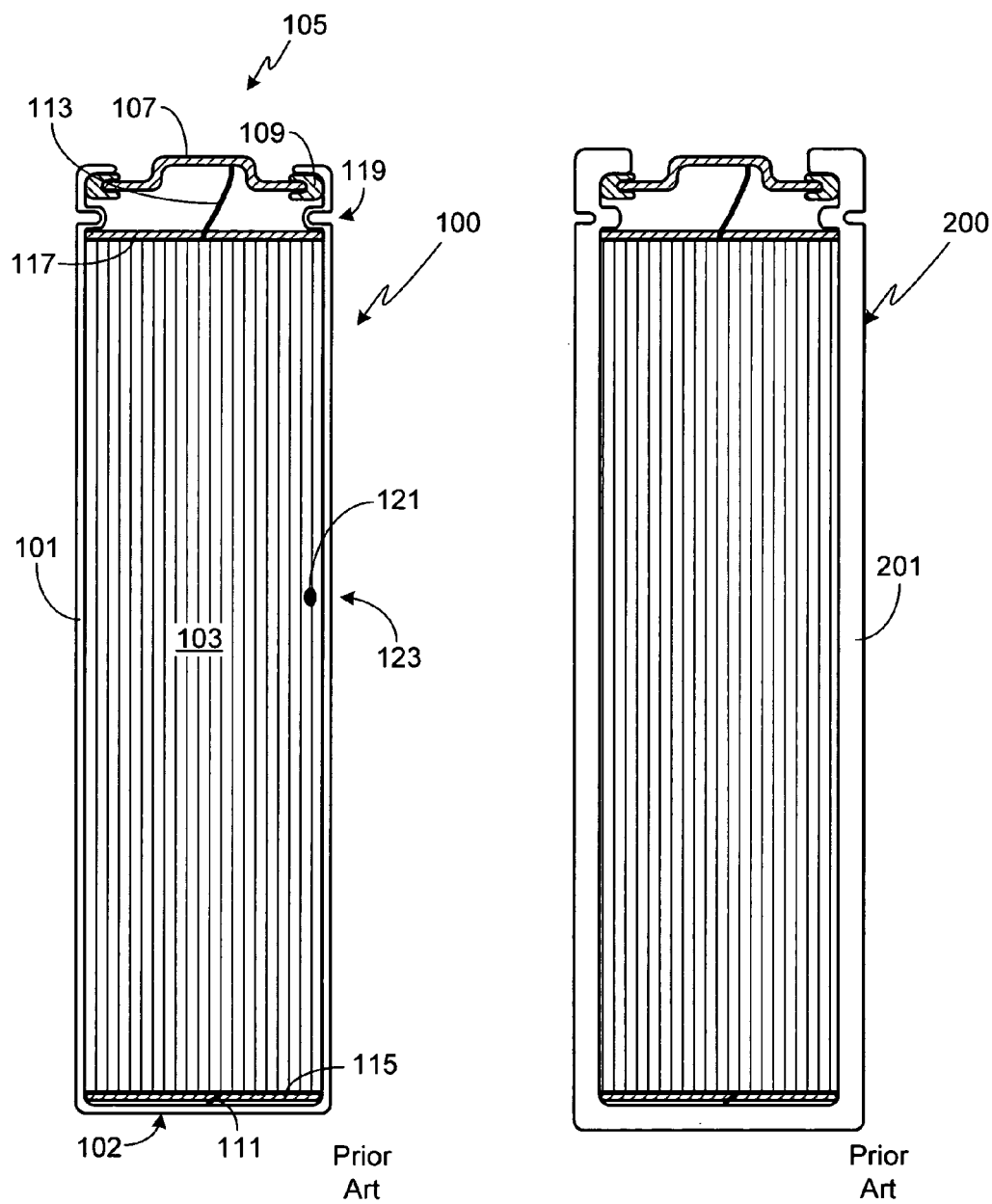
FIG. 1 is a simplified cross-sectional illustration of a cell utilizing the 18650 form-factor.
FIG. 2 illustrates the cell shown in FIG. 1, modified to increase failure resistance in accordance with the prior art approach.

FIG. 1 is a simplified cross-sectional view of a conventional battery 100, for example a lithium ion battery utilizing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. Typically cell casing 101 is fabricated in such a way that the bottom surface 102 is integrated into the case, resulting in a seamless lower cell casing. The open end of cell case 101 is sealed by a cap assembly 105, assembly 105 including a battery terminal 107, e.g., the positive terminal, and an insulator 109, insulator 109 preventing terminal 107 from making electrical contact with case 101. Although not shown, a typical cap assembly will also include an internal positive temperature coefficient (PTC) current limiting device, a current interrupt device (CID), and a venting mechanism, the venting mechanism designed to rupture at high pressures and provide a pathway for cell contents to escape. Additionally, cap assembly 105 may contain other seals and elements depending upon the selected design/configuration.

Electrode assembly 103 is comprised of an anode sheet, a cathode sheet and an interposed separator, wound together in a spiral pattern often referred to as a 'jellyroll'. An anode electrode tab 111 connects the anode electrode of the wound electrode assembly to the negative terminal while a cathode tab 113 connects the cathode electrode of the wound electrode assembly to the positive terminal. In the illustrated embodiment, the negative terminal is case 101 and the positive terminal is terminal 107. In most configurations, battery 100 also includes a pair of insulators 115/117. Case 101 includes a crimped portion 119 that is designed to help hold the internal elements, e.g., seals, electrode assembly, etc., in place.

In a conventional cell, such as the cell shown in FIG. 1, a variety of different abusive operating/charging conditions and/or manufacturing defects may cause the cell to enter into thermal runaway, where the amount of internally generated heat is greater than that which can be effectively withdrawn. As a result, a large amount of thermal energy is rapidly released, heating the entire cell up to a temperature of 900° C. or more and causing the formation of localized hot spots where the temperature may exceed 1500° C. Accompanying this energy release is the release of gas, causing the gas pressure within the cell to increase.

To combat the effects of thermal runaway, a conventional cell will typically include a venting element within the cap assembly. The purpose of the venting element is to release, in a somewhat controlled fashion, the gas generated during the thermal runaway event, thereby preventing the internal gas pressure of the cell from exceeding its predetermined operating range.

While the venting element of a cell may prevent excessive internal pressure, this element may have little effect on the thermal aspects of a thermal runaway event. For example, if a local hot spot occurs in cell 100 at a location 121, the thermal energy released at this spot may be sufficient to heat the adjacent area 123 of the single layer casing wall 101 to above its melting point. Even if the temperature of area 123 is not increased beyond its melting point, the temperature of area 123 in concert with the increased internal cell pressure may quickly lead to the casing wall being perforated at this location. Once perforated, the elevated internal cell pressure will cause additional hot gas to be directed to this location, further compromising the cell at this and adjoining locations.

It should be noted that when a cell undergoes thermal runaway and vents in a controlled fashion using the intended venting element, the cell wall may still perforate due to the size of the vent, the material characteristics of the cell wall, and the flow of hot gas traveling along the cell wall as it rushes towards the ruptured vent. Once the cell wall is compromised, i.e., perforated, collateral damage can quickly escalate, due both to the unpredictable location of such a hot spot and due to the unpredictable manner in which such cell wall perforations grow and affect neighboring cells. For example, if the cell is one of a large array of cells comprising a battery pack, the jet of hot gas escaping the cell perforation may heat the adjacent cell to above its critical temperature, causing the adjacent cell to enter into thermal runaway. Accordingly, it will be appreciated that the perforation of the wall of one cell during thermal runaway can initiate a cascading reaction that can spread throughout the battery pack. Furthermore, even if the jet of hot gas escaping the cell perforation from the first cell does not initiate thermal runaway in the adjacent cell, it may still affect the health of the adjacent cell, for example by weakening the adjacent cell wall, thereby making the adjacent cell more susceptible to future failure.

As previously noted, cell perforations are due to localized, transient hot spots where hot, pressurized gas from a concentrated thermal event is flowing near the inner surface of the cell. Whether or not a cell transient hot spot perforates the cell wall or simply dissipates and leaves the cell casing intact depends on a number of factors. These factors can be divided into two groups; those that are based on the characteristics of the thermal event and those that are based on the physical qualities of the cell casing. Factors within the first group include the size and temperature of the hot spot as well as the duration of the thermal event and the amount of gas generated by the event. Factors within the second group include the wall thickness as well as the casing's yield strength as a function of temperature, heat capacity and thermal conductivity.

FIG. 2 illustrates the conventional approach to improving the failure resistance of a cell, where failure is defined as a thermally induced wall perforation. As shown, in cell 200 the thickness of casing 201 has been significantly increased, thereby improving the cell's failure resistance at the expense of cell weight. Assuming that cell mass is not an issue, which it is not for many consumer applications where only a few cells are used, the conventional approach to preventing wall perforations during thermal runaway is quite effective. Unfortunately, for those applications in which the battery pack may include hundreds or even thousands of cells, for example the battery pack of an electric vehicle, the added mass of this approach is very unattractive since performance is directly tied to mass. For instance, if the conventional approach only adds 4 grams per cell, for a battery pack with 10,000 cells, this increase adds up to 40 kg. Accordingly, for these applications the conventional approach to improving cell failure resistance is unacceptable.

The present inventors recognize the weight constraints placed on the batteries within a large battery pack and the factors that contribute to the initiation and growth of wall perforations during thermal runaway. Additionally, the present inventors recognize that once a cell enters into thermal runaway it is no longer viable, and therefore at this point the primary purpose of the cell casing is to control the direction and pathway for the hot, escaping gas generated by the thermal runaway event. In recognition of these design parameters, the intent of the present invention is to minimize, if not altogether eliminate, the escape of hot, pressurized gas from the sides of a cell where the escaping gas can adversely affect neighboring cells. Rather than allow the hot gas to escape through wall perforations, the present invention forces this gas to exit the cell from either end surface, or in some embodiments, from only one of the cell end surfaces.

Figure 3:
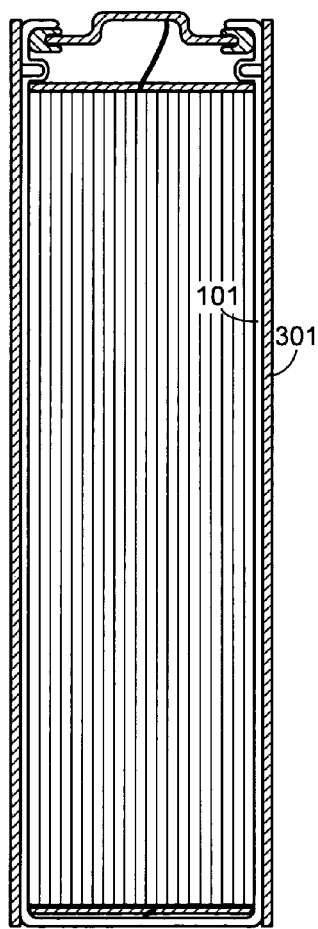
FIG. 3 illustrates a preferred embodiment of the invention utilizing a high strength sleeve.

FIG. 3 illustrates one embodiment of the invention. In this embodiment, a conventional cell such as that shown in FIG. 1 is modified by sliding a sleeve 301 lengthwise over the outer casing wall 101. Typically sleeve 301 is added after fabrication of the cell has been completed, but prior to the inclusion of the cell within the cell's intended application, e.g., a battery pack. Sleeve 301 may be added by the cell manufacturer or added by another party. Preferably there is minimal clearance between the inner surface of sleeve 301 and the outer surface of cell casing 101. In at least one embodiment, sleeve 301 is press-fit, also commonly referred to as a force fit, onto case 101, for example using a hydraulic press-fit system.

The use of a separate sleeve offers a number of advantages over the conventional approach of simply increasing the wall thickness of casing 101. First and foremost, the goals of significantly decreasing the risk of hot, pressurized gas escaping through the cell wall and redirecting this escaping gas to the cell ends are both achieved while adding much less weight to the cell than would be required to achieve the same performance using the conventional, wall-thickening approach. Second, as sleeve 301 is preferably added after completion of cell processing, this approach can be used with virtually any manufacturer's cell since it does not affect cell manufacturing. Third, while the material selected for casing 101 must be non-reactive with the cell contents (e.g., electrolyte and electrode assembly), no such material constraints are placed on sleeve 301. Accordingly the material used for sleeve 301 can be selected based on its ability to minimize or eliminate the escape of hot, pressurized gas from the cell sidewalls.

During thermal runaway, when a transient hot spot (e.g., spot 121 in FIG. 1) develops, sleeve 301 performs several functions. Initially, it draws off heat from the cell case 101 at the location adjacent to the transient hot spot (e.g., location 123 of case 101 in FIG. 1), thereby slowing down the perforation of the wall. If a perforation in casing 101 starts, then sleeve 301 prevents the immediate and rapid growth of the perforation that would otherwise occur due to the pressurized hot gas being directed through the perforation. Additionally, due to the thermal contact resistance between case 101 and sleeve 301, and given the limited duration of the thermal event, sleeve 301 is more resistive to perforation than case 101. The failure resistance of sleeve 301 is further enhanced by fabricating the sleeve from a material that exhibits high yield strength at high temperature. Preferably the yield strength of sleeve 301 is at least 250 MPa at room temperature, more preferably at least 250 MPa at a temperature of 1000° C., still more preferably at least 500 MPa at room temperature, and yet still more preferably at least 500 MPa at a temperature of 1000° C.

Given the thermal contact resistance between the case and the sleeve, and given that the sleeve is preferably constructed of a material with the desired material characteristics, typically only casing 101 will be perforated during thermal runaway, leaving outer sleeve 301 intact. As a result, adjacent cells are not subjected to a stream of high temperature, pressurized gas. Additionally, in this situation, and given the minimal clearance between the outer surface of case 101 and the inner surface of sleeve 301, sleeve 301 prevents the rapid growth of the case wall perforation, thereby minimizing the amount of gas that escapes through the case wall perforation. This effect is aided by the cell case dimensions expanding slightly during thermal runaway due to the increased internal pressure, thereby further improving the contact between the outer cell surface and the interior surface of the sleeve. Accordingly little, if any, hot gas escapes through the case wall perforation and that which does escape is redirected by sleeve 301 to either cell end where its effects on neighboring cells are minimized.

It will be appreciated that there are a variety of materials suitable for use in constructing sleeve 301. Exemplary materials include various engineering and high strength structural steels, plated steel, stainless steel, titanium and titanium alloys, and nickel alloys. The preferred technique or techniques for fabricating sleeve 301 depend on the selected material as well as the shape of the cell for which the sleeve is to be used. For example, if the cell has the 18650 form-factor, sleeve 301 is cylindrically shaped. Sleeve 301 may be fabricated using any of a variety of techniques including, but not limited to, (i) drawing the sleeve, (ii) wrapping a strip or sheet of the desired material around the cell and welding or mechanically coupling the edges together, (iii) bending and welding a strip or sheet of the desired material into the desired shape, or (iv) bending a strip or sheet of the desired material into the desired shape and coupling the two edges together using mechanical interconnects. Sleeve 301 may be bonded into place.

Figure 4:
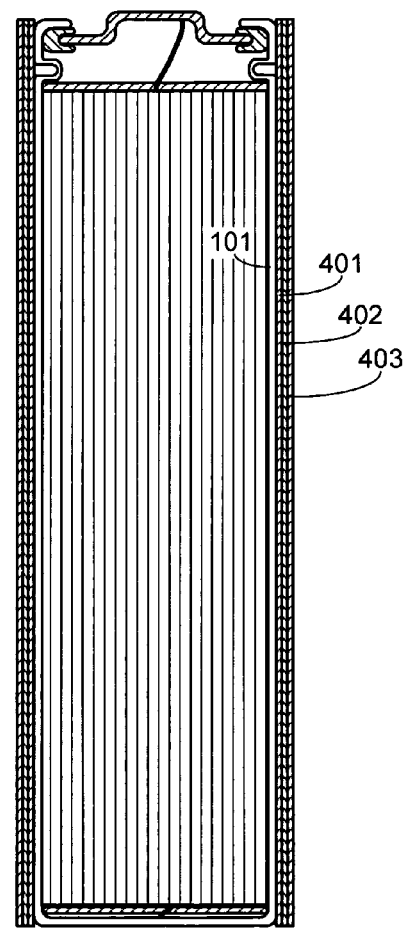
FIG. 4 illustrates an alternate embodiment utilizing multiple high strength sleeves.

FIG. 4 illustrates an alternate embodiment of the invention. In this embodiment, a conventional cell such as that shown in FIG. 1 is modified by wrapping the cell with a plurality of layers 401-403. Preferably three layers are used, as shown, although it will be appreciated that either a fewer number or a greater number of layers can be used in this embodiment. Preferably all of the layers are comprised of a material exhibiting high yield strength at high temperatures, more specifically a yield strength of at least 250 MPa at room temperature, still more preferably at least 250 MPa at a temperature of 1000° C., still more preferably at least 500 MPa at room temperature, and yet still more preferably at least 500 MPa at a temperature of 1000° C. The plurality of layers may be comprised of the same material, or of one or more different materials. Exemplary materials include various engineering and high strength structural steels, plated steel, stainless steel, titanium and titanium alloys, and nickel alloys.

The inventors have found that due to the thermal contact resistance between layers 401-403, in addition to the thermal contact resistance between casing 101 and the innermost layer 401, the use of multiple layers is more effective than a single layer sleeve as shown in FIG. 3. Following this approach, and even using the same material, the additive thickness of layers 401-403 can be less than the thickness of sleeve 301 while achieving the same level of perforation resistance. For example, in one test the inventors found that three 25 micron thick layers of stainless steel were just as effective as a single, 100 micron thick layer of stainless steel. Accordingly, further mass reductions can be achieved by encasing the cell in multiple layers as opposed to a single layer sleeve.

As in the previous embodiment, there is minimal clearance between the layers as well as between the innermost layer and the outer surface of cell casing 101. The layers of this embodiment can be fabricated as individual sleeves of gradually increasing inside diameter or, as preferred, fabricated from a single strip or sheet that is wrapped multiple times around the outside of the cell case. The layers, and/or the final, outermost edge of the outermost layer, can be bonded, welded, or held in place with mechanical interconnects.

As in the prior embodiment, the layers of the present embodiment control the growth of any cell wall perforations while preventing hot, pressurized gas from being directed at adjacent cells.

In an alternate preferred embodiment of the invention, a pair of layers (FIG. 5), or multiple pairs of layers (FIG. 6), surround the battery case (e.g., cell case 101 in FIG. 1). Although the embodiment shown in FIG. 6 only includes two sets of layers, it will be appreciated that additional layer pairs can be used with the invention.

Figure 5:
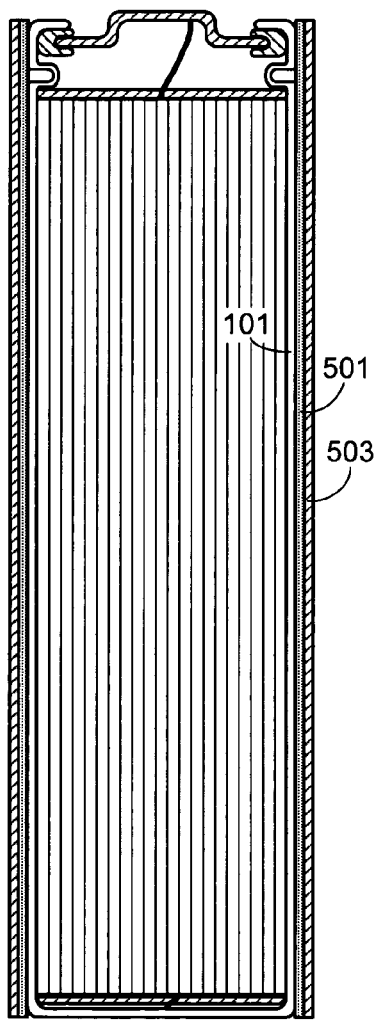
FIG. 5 illustrates an alternate embodiment utilizing an inner, thermally insulating layer and an outer, high strength layer.
Figure 6:
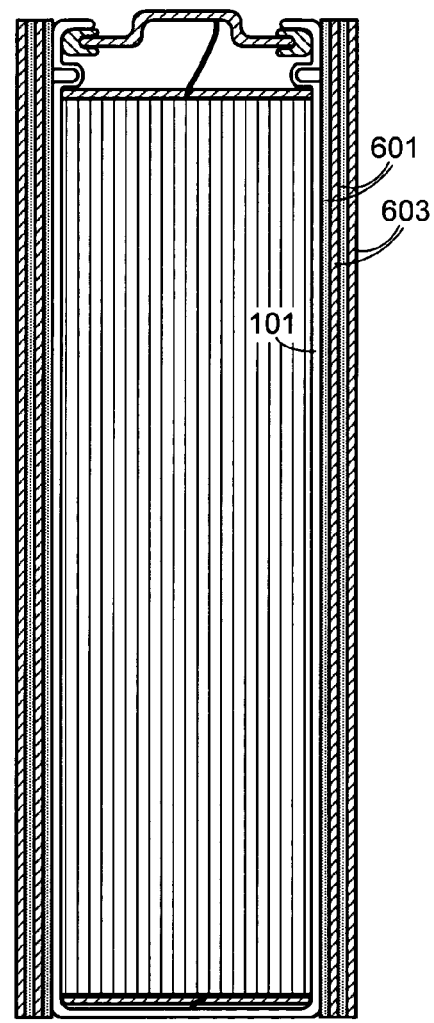
FIG. 6 illustrates a modification of the configuration shown in FIG. 5, the modified configuration including multiple layers that alternate between thermally insulating material and high strength material.

The innermost layer of each layer pair, e.g., layer 501 in FIG. 5 and each layer 601 in FIG. 6, is comprised of a thermal insulator, preferably a light weight thermal insulator. The outermost layer of each layer pair, e.g., layer 503 in FIG. 5 and each layer 603 in FIG. 6, is comprised of a high yield strength material. Preferably the high yield strength material used in layer 503/603 has a yield strength of at least 250 MPa at room temperature, more preferably at least 250 MPa at a temperature of 1000° C., still more preferably at least 500 MPa at room temperature, and yet still more preferably at least 500 MPa at a temperature of 1000° C. Exemplary high yield strength materials include, but are not limited to, various engineering and high strength structural steels, plated steel, stainless steel, titanium and titanium alloys, and nickel alloys.

In one configuration, the material used for the thermal insulator layers, e.g., layer 501 in FIG. 5 and each layer 601 in FIG. 6, is capable of withstanding a relatively high temperature, for example, capable of withstanding temperatures of more than 500° C. continuously and/or withstanding temperatures of more than 1000° C. for a period of at least 10 seconds and/or withstanding temperatures of more than 1400° C. for a period of at least 1 second. It will be appreciated that there are numerous materials and composite materials that can be used to fabricate this layer. Exemplary materials include, but are not limited to, fiberglass, mineral wool, silica/silica fibers, alumina, Kevlar®, Nomex®, calcium-silicate or calcium-magnesium-silicate fibers, some ceramics, etc.

In an alternate configuration, the material used for the thermal insulator layers, e.g., layer 501 in FIG. 5 and each layer 601 in FIG. 6, is an insulator with a relatively low melting temperature, for example, with a melting temperature of less than a 500° C., more preferably less than 350° C., and still more preferably less than 250° C. Exemplary materials include, but are not limited to, plastics, more specifically a polymer such as polyethylene or polypropylene.

During a thermal runaway event, when a transient hot spot is formed (e.g., spot 121 of FIG. 1), the thermally insulating layer (e.g., layer 501) significantly reduces the temperature of the high yield strength layer (e.g., layer 503) adjacent to the hot spot, thereby drastically reducing the risk of a perforation forming in the outermost, high yield strength layer. The use of two or more layer pairs as shown in FIG. 6 further reduces this risk by requiring that the hot, pressurized gas from the transient hot spot ablate two or more thermally insulating layers and two or more high yield strength layers. It will be appreciated that by lowering the temperature near the transient hot spot, the high yield strength layer can be thinner than would otherwise be required, resulting in further weight gains. In this embodiment, one of the primary purposes of the high yield strength layer (e.g., layer 501, layer 601) is to provide a strong support layer for the thermal insulator, thereby preventing its rapid ablation by the pressurized, hot gas.

The thermally insulating layer (e.g., layer 501, layers 601) can be fabricated in a variety of ways, depending upon the material or materials used to fabricate the layer. For example, this layer can be formed by bonding or otherwise attaching a thin layer of suitable thermal insulator to the cell case, or to the underlying high yield strength layer in the configuration utilizing multiple layer pairs. This thermally insulating layer may be preformed using a weaving, machining, or other technique. Alternately, this layer can be fabricated by rolling, dipping or spraying the cell, or the underlying high yield strength layer, with the thermally insulating material. Alternately, this layer can be deposited on the inner surface of the high strength layer (e.g., layer 503, layers 603) prior to the assembly of the high strength layer onto the cell. As previously described relative to layers 301 and 401-403, high strength layer 503 can be fabricated as a sleeve or as a strip or sheet of suitable material that is bent to shape and held together by welding, bonding or mechanical interconnects.

In a modification of the embodiment shown in FIG. 5, a layer of thermally insulating material is interposed between the inside wall surface of case 100 and the exterior surface of the electrode assembly (FIG. 7). As in the prior embodiments shown in FIGS. 5 and 6, the thermally insulating layer 701 shown in FIG. 7 minimizes the transfer of thermal energy from the transient hot spot to the next layer which, in this configuration, is outer cell casing 101. Given the relatively short duration of the thermal event, the delay provided by layer 701 is sufficient to prevent the pressurized hot gas accompanying the transient hot spot from perforating casing 101. In this embodiment, case 101 provides the strength and support necessary to ensure that the region of layer 701 adjacent to the hot spot is not rapidly ablated away, thereby eliminating its usefulness.

Although the use of a single, light weight, thermally insulating layer 701 as shown in FIG. 7 can dramatically improve the cell's resistance to wall perforations during thermal runaway, the inclusion of such a layer is not without its drawbacks. Primarily, the material or materials selected for use in layer 701 must be non-reactive with the electrolyte and electrode assembly. Additionally, the inclusion of layer 701 requires modifying the cell fabrication and assembly process.

As in the previous embodiment, preferably thermally insulating layer 701 is fabricated from a thermal insulator that is capable of withstanding temperatures of more than 500° C. continuously and/or withstanding temperatures of more than 1000° C. for a period of at least 10 seconds and/or withstanding temperatures of more than 1400° C. for a period of at least 1 second. Exemplary materials include, but are not limited to, fiberglass, mineral wool, silica/silica fibers, alumina, Kevlar®, Nomex®, calcium-silicate or calcium-magnesium-silicate fibers, some ceramics, etc.

Preferably layer 701 is formed by depositing or otherwise coating the inside surface of case 101 with the selected thermal insulator, this deposition/coating step being performed prior to assembling the electrode assembly within the cell casing. Alternately, the exterior surface of the electrode assembly may be deposited or otherwise coated with the selected thermal insulator, this deposition/coating step being performed prior to assembling the electrode assembly within the cell casing. Alternately, a sheet/strip of the selected thermal insulator can be formed, after which the sheet/strip is wrapped around the outside surface of the electrode assembly before assembly within the cell casing. Alternately, a sleeve of the selected thermal insulator can be formed, with or without a bottom surface, and inserted within the cell case prior to final assembly.

In a variation of the embodiment described above, layer 701 is not formed from a thermal insulator, but formed from the same separator, or a similar separator, as that used during the fabrication of the electrode assembly (i.e., assembly 103). By using the same separator, fabrication is simplified as the winding process that is used to create the electrode jellyroll can be used to create the additional separator layers, simply by lengthening the separator material relative to the lengths of the anode and cathode materials. Typically the separator is fabricated from a thermoplastic, such as polyethylene, polypropylene or some combination of the two. In a slight modification of this embodiment, in addition to wrapping extra layers of separator around the jellyroll, layers of one or more metals are also wrapped around the jellyroll. The metal or metals within the extra layers may be the same metals used to form the cathode and/or anode of the electrode assembly, as long as these additional metal layers are not part of the active electrode assembly.

During a thermal runaway event, the additional layers of separator, or the additional layers of the separator plus metal layer(s), absorb some of the energy released during the thermal runaway event, thereby inhibiting the formation of perforations in the cell case wall. These extra separator layers, with or without the additional non-active metal layer(s), also help to prevent short circuits from occurring between the electrode assembly and the cell case.

In another variation of the embodiment described above, layer 701 is not formed from a thermal insulator or from a separator, but formed from at least one layer of metal. The at least one layer of metal is non-reactive with the electrode assembly, including the electrolyte, and is not an active element of the electrode assembly. An exemplary metal for at least some cell chemistries is steel, or a steel alloy. Preferably this layer or layers of metal (e.g., layer 701) is wound around the electrode assembly prior to inserting the assembly into cell casing 101.

FIG. 8 illustrates an alternate preferred embodiment of the invention utilizing the addition of a layer 801 surrounding the outer surface of the cell case, layer 801 comprised of a material with a latent heat of fusion of at least 200 kJ/kg, more preferably with a latent heat of fusion of at least 300 kJ/kg, and still more preferably with a latent heat of fusion of at least 350 kJ/kg. Preferably the material has a melting point between 300° C. and 1500° C., and more preferably between 500° C. and 1200° C. Although a variety of materials can be used for layer 801, preferably layer 801 is fabricated from aluminum or an aluminum alloy.

During thermal runaway, when a transient hot spot (e.g., spot 121 in FIG. 1) develops, layer 801 rapidly draws off the heat from the cell case 101 at the location adjacent to the transient hot spot. By rapidly drawing off the heat, the temperature in this region of the case (e.g., location 123 of case 101 in FIG. 1) never reaches its melting point or becomes so weak that the internal cell pressure can perforate the cell casing at this location. It will be appreciated that although a portion of layer 801 adjacent to the transient hot spot may melt during this process, given the relatively short duration of the event, and given that layer 801 is not repeatedly subjected to thermal runaway conditions, the loss of this portion of layer 801 via melting does not compromise the performance of this embodiment.

As with the embodiment illustrated in FIG. 3, layer 801 may be drawn (e.g., as a sleeve), fabricated by bending and welding a strip or sheet into the desired shape, or fabricated by bending a strip or sheet into the desired shape and coupling the two edges together using mechanical interconnects. Layer 801 may be bonded into place, welded into place, press-fit into place, or otherwise fit to cell case 101. As in the embodiments discussed above and illustrated in FIGS. 3-6, there is minimal clearance between layer 801 and the outer surface of cell casing 101.

Figure 9:
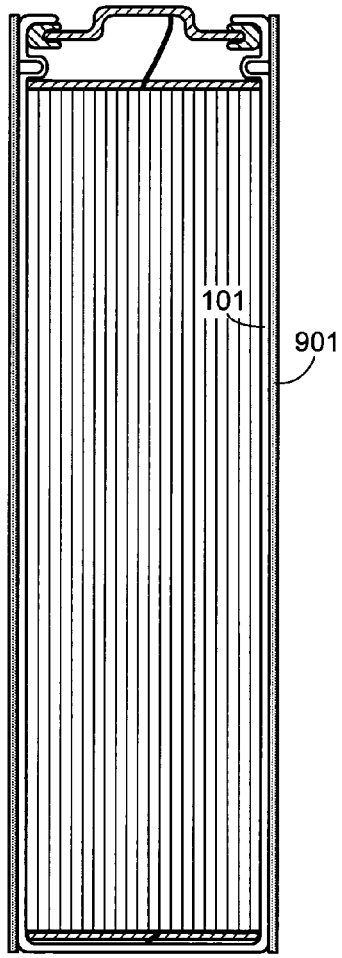
FIG. 9 illustrates an alternate embodiment utilizing a coating of an intumescent material applied to the outer surface of the battery casing.

FIG. 9 illustrates an alternate preferred embodiment of the invention in which the outer surface of the cell case is coated with a layer 901 of an intumescent material. During thermal runaway, the exterior surface of the battery heats up, this heating process typically initiating at one or more transient hot spots (e.g., spot 121 in FIG. 1). Intumescent layer 901 begins to expand as soon as the material's start expansion temperature (SET) is reached. Accordingly, layer 901 typically will begin to expand at a location near the transient hot spots, and then will continue to expand as the entire battery heats up past the SET temperature. After expansion, the intumescent material of layer 901 hardens. Intumescent layer 901 helps to prevent the formation of a perforation in the battery case near the transient hot spots and, if one is formed, helps to contain the escaping hot, pressurized gas.

Figure 10:
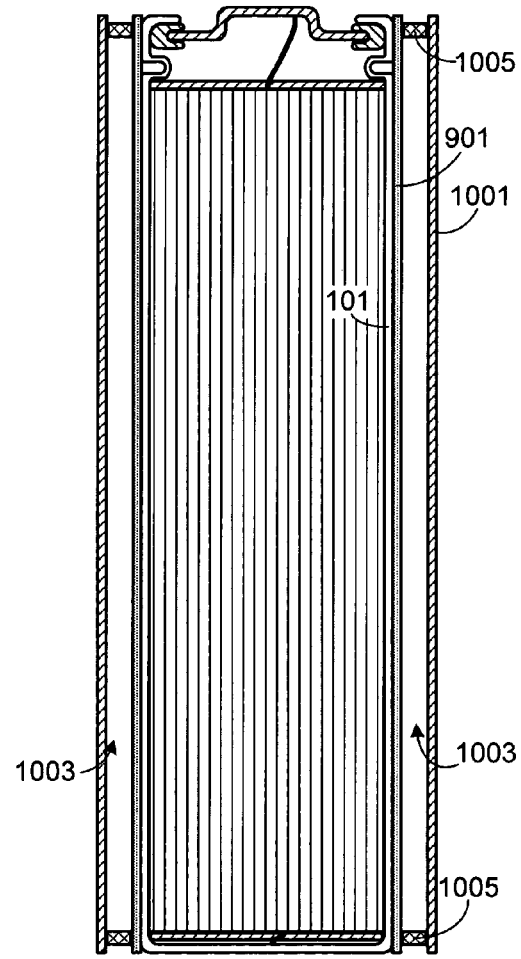
FIG. 10 illustrates a modification of the configuration shown in FIG. 9, in which an outer containment sleeve is positioned around said intumescent coated cell.

FIG. 10 illustrates a slight modification of the embodiment shown in FIG. 9. In the modified configuration, an outer sleeve 1001 surrounds the intumescent covered cell. Preferably sleeve 1001 has a yield strength of at least 75 MPa, more preferably at least 150 MPa, and yet still more preferably at least 250 MPa. The interior surface of sleeve 1001 is spaced apart from the intumescent covered cell by a spacing 1003, thus insuring that intumescent layer 901 has room to expand. At the same time, sleeve 1001 helps to prevent layer 901, after expansion, from being ablated away by the hot, pressurized gas escaping from within the cell. Sleeve 1003 may be held in place using various means, such as with one or more spacer rings 1005. Alternately, the battery pack mounting substrate may be configured to maintain the position of sleeve 1003 relative to the intumescent covered battery.

Intumescent layer 901 can be fabricated from any of a variety of intumescent materials, for example, graphite-based intumescent material (e.g., expandable graphite in a polymeric binder), thermoplastic elastomers, ceramic-based intumescent material, vermiculite/mineral fiber based intumescent material, and ammonium polyphosphate based intumescent material. Preferably the selected intumescent material has a SET temperature in the range of 100° C. to 300° C., and more preferably in the range of 200° C. to 300° C. Preferably the intumescent material selected for layer 901 is biologically inert, thus insuring that if the intumescent covered cell is used in an application with limited airflow, the layer's activation will be a non-toxic event.

Preferably layer 901 is formed by depositing or otherwise coating the outer surface of case 101 with the intumescent material. Alternately, a sheet/strip of the intumescent material can be pre-formed, after which the sheet/strip is wrapped around the outside surface of the cell casing. In this configuration, the sheet/strip of the intumescent material is preferably bonded in place.

Figure 11:
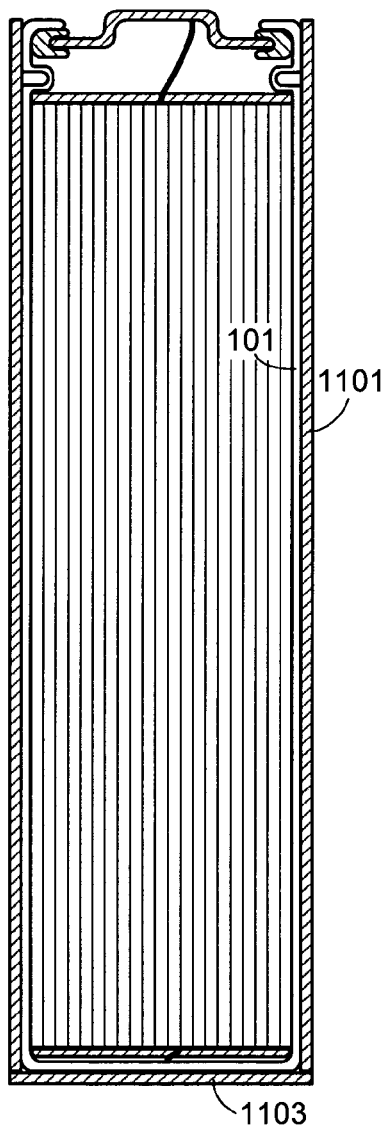
FIG. 11 illustrates a modification of the configuration shown in FIG. 3, the modified configuration including a multi-piece design that covers the end surface of the cell.
Figure 12:
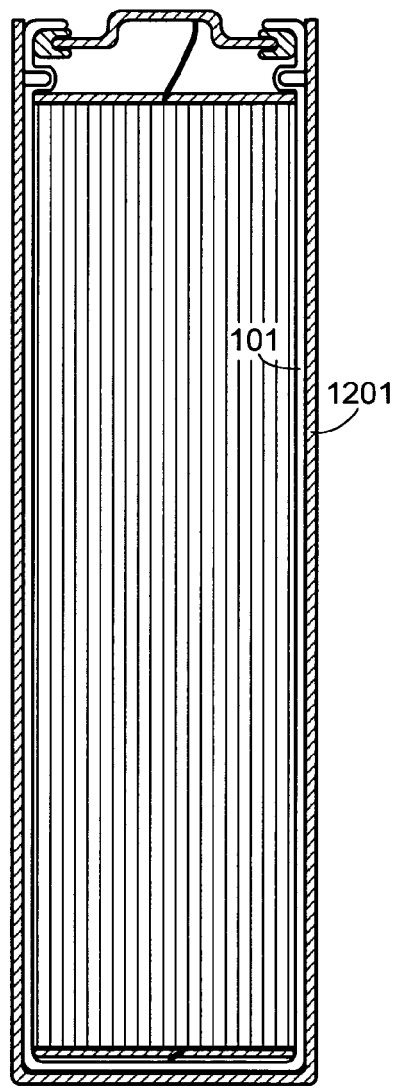
FIG. 12 illustrates a modification of the configuration shown in FIG. 3, the modified configuration including a single piece design that covers the end surface of the cell.

Although the embodiments described above successfully mitigate the effects of cell wall perforations, at least some of these embodiments may allow gas escaping from the cell to travel between the cell wall and the sleeve(s), exiting from either end of the cell. While the inventors have found that this is acceptable for most applications, they envision that for some applications it may be preferable to limit the escaping gas to a single cell end, and preferably the same end that includes the venting element. Accordingly, for such applications, one end of the sleeve(s) is closed, using either a multi-piece or a single piece design. FIG. 11 illustrates a multi-piece design based on the embodiment shown in FIG. 9 that includes both an intumescent a layer 1101 and a bottom intumescent layer 1103. FIG. 12 illustrates design based on the embodiment shown in FIG. 9 in which intumescent layer 1201 covers both the sidewall and the bottom surface of case 101. It will be appreciated that such a design configuration can be applied to the other embodiments described above. For example, the bottom cell surface may covered with a layer pair, the layer pair comprised of a thermally insulating material and a high yield strength material; alternately, the bottom cell surface may be covered by a high heat capacity material; alternately, a thermally insulating material may be interposed between the bottom of the electrode assembly and the inner surface of the bottom of the cell casing; alternately, the bottom cell surface may be covered by a high yield strength material layer.

Although the preferred embodiment of the invention is utilized with a cell using the 18650 form-factor, it will be appreciated that the invention can be used with other cell designs, shapes and configurations.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery assembly, comprising:
   a battery, said battery comprising:
   a cell case having an outer sidewall surface, a first end and a second end, wherein said first end portion is comprised of a cell case bottom, and wherein said second end portion is comprised of a cap assembly retention lip and a central open portion;
   an electrode assembly contained within said cell case, wherein a first electrode of said electrode assembly is electrically connected to said cell case; and
   a cap assembly mounted to said cell case, said cap assembly closing said central open portion of said second end portion, wherein said cap assembly further comprises a battery terminal electrically isolated from said cell case and electrically connected to a second electrode of said electrode assembly;
   a layer of an intumescent material surrounding said outer sidewall surface of said cell case; and
   a sleeve, wherein said sleeve surrounds said intumescent material, and wherein said sleeve is spaced apart from said intumescent material.

2. The battery assembly of claim 1, wherein said sleeve is fabricated from a material with a yield strength of at least 75 MPa.

3. The battery assembly of claim 1, wherein said sleeve is fabricated from a material with a yield strength of at least 150 MPa.

4. The battery assembly of claim 1, wherein said sleeve is fabricated from a material with a yield strength of at least 250 MPa.

5. The battery assembly of claim 1, further comprising at least one spacer ring, wherein said at least one spacer ring separates an interior surface of said sleeve from an exterior surface of said intumescent material prior to the thermal runaway event.

6. A method of preventing the formation of a perforation in an outer sidewall surface of a battery case during a thermal runaway event, the method comprising the steps of covering said outer sidewall surface of said battery case in a layer of an intumescent material, surrounding said layer of said intumescent material with a sleeve, said surrounding step further comprising the step of separating said layer of said intumescent from an interior surface of said sleeve by a preset distance, wherein said covering step is performed prior to said thermal runaway event, and wherein said intumescent material expands during said thermal runaway event.

* * * * *